United States Patent [19]

Fling et al.

[11] Patent Number: 4,882,626

[45] Date of Patent: Nov. 21, 1989

[54] SIGNAL COMBINING CIRCUITRY

[75] Inventors: Russell T. Fling, Noblesville; Donald H. Willis, Indianapolis, both of Ind.

[73] Assignee: RCA Licensing Corporation, Princeton, N.J.

[21] Appl. No.: 290,859

[22] Filed: Dec. 27, 1988

Related U.S. Application Data

[63] Continuation-in-part of Ser. No. 190,316, May 4, 1988, abandoned.

[51] Int. Cl.$^4$ .............................................. H04N 5/14
[52] U.S. Cl. ..................................... 358/166; 358/37; 358/447
[58] Field of Search ................... 358/31, 36, 37, 39, 358/160, 166, 167, 284

[56] References Cited

U.S. PATENT DOCUMENTS

| | | | |
|---|---|---|---|
| 4,231,065 | 10/1980 | Fitch et al. | 358/166 |
| 4,268,864 | 5/1981 | Green | 358/166 |
| 4,408,233 | 10/1983 | Nahon et al. | 358/284 |
| 4,607,278 | 8/1986 | Flamm | 358/36 |
| 4,617,589 | 10/1986 | Weckenbrock | 358/36 |
| 4,621,290 | 11/1986 | Fling | 358/166 |
| 4,636,842 | 1/1987 | Hartmeier | 358/31 |

OTHER PUBLICATIONS

T. Okada et al., "New Filter Technology in Picture Processing", presented at ICCE Conference, Jun. 9, 1982.

Primary Examiner—James J. Groody
Assistant Examiner—Michael D. Parker
Attorney, Agent, or Firm—Joseph S. Tripoli; Eric P. Herrmann

[57] ABSTRACT

A signal combining circuit for adaptively combining first and second signals includes a comparator to develop a control signal to indicate when the combination of the first and second signals will have an amplitude exceeding a predetermined amplitude in one polarity sense. In the absence of the control signal the first and second signals are combined. On the occurrence of the control signal the first signal is combined with a further signal related to the first signal and a reference value.

19 Claims, 3 Drawing Sheets

SIGNAL COMBINING CIRCUITRY

This application is a continuation-in-part of application Ser. No. 190,316 filed 05/04/88 (abandoned).

The present invention is related to electronic circuitry for combining two signals and which is adaptively controlled in accordance with the amplitudes of the signals being combined.

BACKGROUND OF THE INVENTION

In, for example, video signal processing systems, it is desirable to enhance the effective frequency response of particular signal components. This may be accomplished by examining the signal for transitions, developing a signal proportional to the transition, and combining the developed signal with the original signal in a manner to either reduce the transition time or alternatively to augment (peak) the signal immediately adjacent the transition.

Peaking in conventional TV receivers is generally performed subsequent to detecting the synchronizing components of the video signal. However in current receivers including enhanced features, it may be more economical to perform peaking prior to detecting the synchronizing components. In such a configuration the peaked signal may include portions having amplitudes comparable to the amplitude of the horizontal sync tips. These portions will confuse the synchronizing component detectors and produce undesirable effects in the processing system.

SUMMARY OF THE INVENTION

The present invention is directed toward circuitry for adaptively combining first and second signals (for example a video signal and a peaking signal). The first and second signals are coupled to a comparing means which develops a control signal indicating when the combination of the first and second signals will have an amplitude exceeding a predetermined amplitude in one polarity sense. In the absence of the control signal the first and second signals are combined. In the presence of the control signal the first signal is combined with a further signal related to the first signal.

DETAILED DESCRIPTION

The invention may be practiced on either analog or digital signals, however it will be described in terms of parallel bit sampled data pulse code modulated signals e.g. twos complement samples. For illustrative purposes, the vehicle selected is circuitry in a television receiver for enhancing the vertical detail of the processed image.

Figure 1:
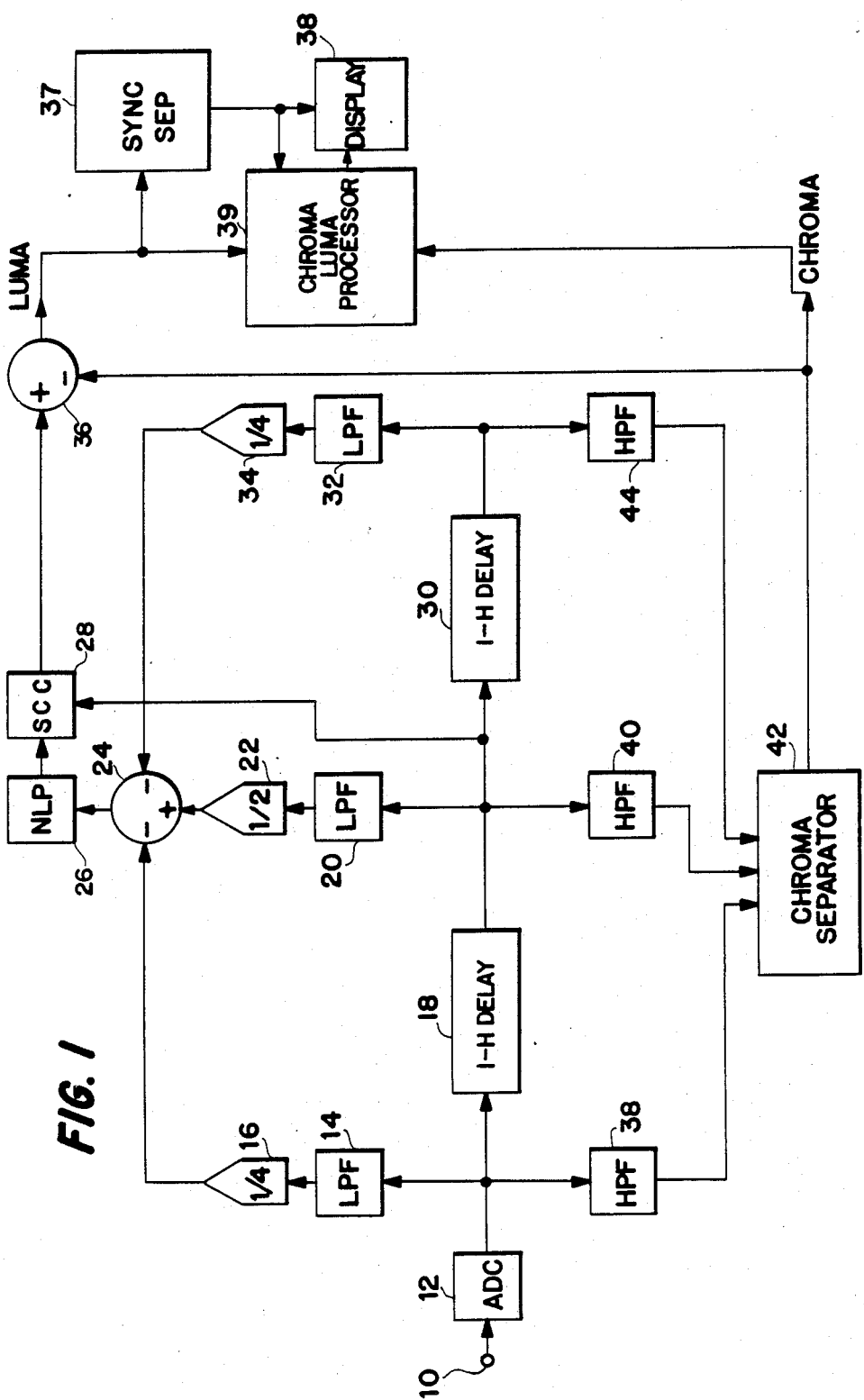
FIG. 1 is block diagram of a portion of the circuitry in a television receiver including the present invention.
Figure 3:
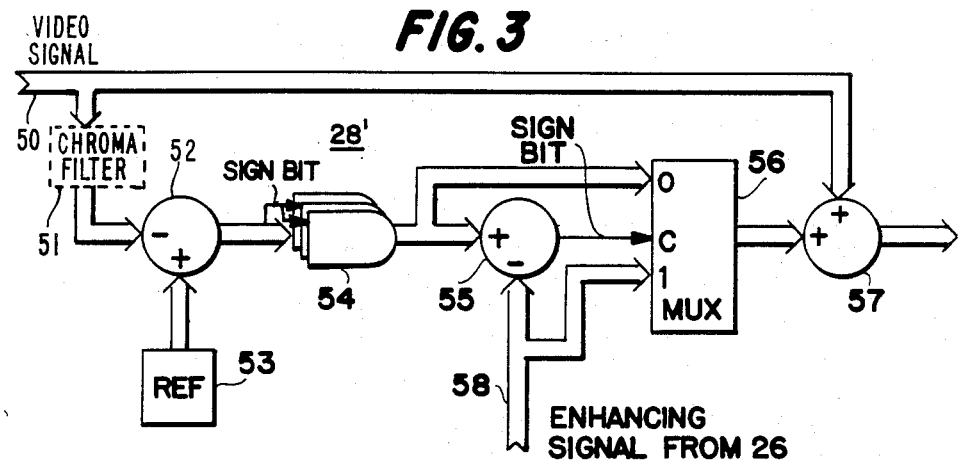
FIG. 3 is a block diagram of one embodiment of the signal combining circuitry of the present invention.
Figure 4:
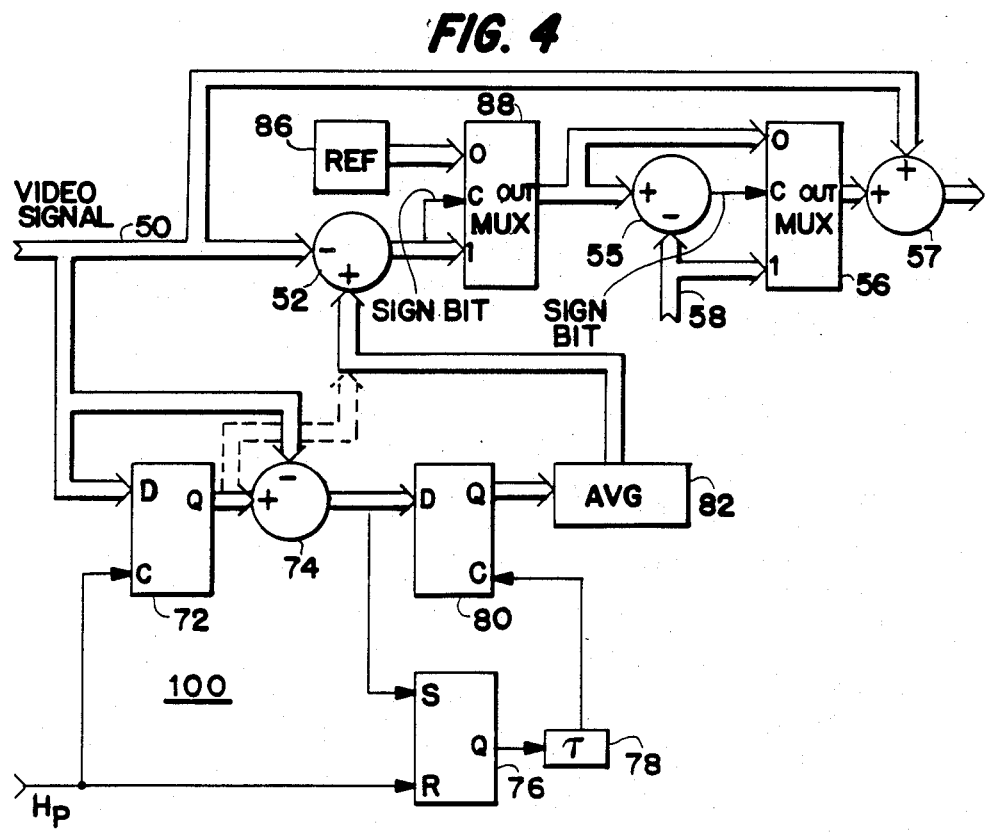
FIG. 4 is a block diagram of a second embodiment of signal combining circuitry of the present invention.

In FIG. 1 the narrow lines interconnecting circuit elements are presumed to be parallel bit busses. In FIGS. 3 and 4 the broad arrows interconnecting circuit elements are parallel bit busses and the narrow arrows are single conductor connections. In FIGS. 1, 3 and 4 compensating delay elements may be required between certain processing elements to properly time align respective signals which may undergo different processing delays. These elements have been omitted to simplify the description of the invention, however one skilled in the art of video signal processing will readily recognize where such compensating delays are required.

The circuitry illustrated in FIG. 1 is a chroma/luma separator which separates the chrominance and luminance components of composite video signal In addition circuitry is included for enhancing the vertical detail of the luminance component. In FIG. 1 baseband analog composite video signal is applied from, for example, tuner circuitry (not shown) to input terminal 10. This signal is coupled to the analog-to-digital converter (ADC) 12 wherein it is converted to plural-bit binary samples and at a rate sufficient to satisfy the Nyquist sampling criterion.

Samples from the ADC 12 are coupled to the low pass filter 14, the high pass filter 38 and the delay element 18. Low pass filter 14 attenuates signal frequencies occurring in the frequency spectrum normally occupied by the chrominance component of composite video signal. High pass filter 38 attenuates signal frequences occurring below the spectrum normally occupied by the chrominance component. Filter 38 (and filters 40 and 44) may be chrominance band pass filters. Alternatively the filter function of filter 38 may be realized by subtracting the output of low pass filter 14 from the signal coupled to its input. In this instance filters 14 and 38 will have complementary frequency response characteristics. Delay element 18 delays samples by one horizontal line period and has its output coupled to low pass filter 20, high pass filter 40 and delay element 30. Delay element 30 delays samples by one horizontal line period and has its output coupled to low pass filter 32 and high pass filter 44. High pass filters 40 and 44 are similar to high pass filter 38 and low pass filters 20 and 32 are similar to low pass filter 14. High pass filtered samples from filters 38, 40 and 44 are coupled to the chrominance separator 42 which produces the chrominance component of composite video signal. Chrominance separator 42 may be of the type disclosed in U.S. Pat. No. 4,636,840 issued 1/13/87 to McNeely and Fling or U.S. Pat. No. 4,050,084 issued 9/20/77 to Rossi, both of which are herein incorporated by reference.

Low pass filtered composite video signal from filters 14, 20 and 32 are respectively scaled by factors ¼, ½, and ¼ by scaling circuits 16, 22, and 34. Scaled samples from weighting circuit 22 are summed with the negative of scaled samples from scaling circuits 16 and 34 in the combining circuit 24. The combined signal provided by circuit 24 is related to vertical or line-to-line changes of the low frequency luminance component. The signal provided by combining circuit 24 is coupled to a non-linear-processor (NLP) 26. NLP 26 may be one of several different functional elements. For example NLP 26 may include a differentiator to generate peaking signals occurring only at vertical transitions having predetermined minimum amplitudes. Alternatively NLP 26 may be a non-linear gain element which cores signal in a first amplitude range, amplifies signal in a second intermediate amplitude range and attenuates signal in a third large amplitude range. Apparatus of this latter type is described in U.S. Pat. No. 4,422,094 which is herein incorporated by reference.

Signal from NLP 26 and delayed composite video signal from delay element 18 are combined in signal combining circuit (SCC) 28 to produce composite video with lower frequency components (related to vertical transitions) enhanced. Signal from SCC 28 and signal from chrominance separator 42 are coupled to subtracter 36 wherein the chrominance component is subtracted from the composite video signal to produce the luminance component.

Luminance signal from subtracter 36 is coupled to processor 39 and sync separator 37. Sync separator 37 extracts the synchronizing components from the luminance signal and develops the necessary signals to appropriately control both the processor 39 and the display element 38.

Chrominance signal from separator 42 is coupled to processor 39 which appropriately conditions and combines the chrominance and luminance components to produce signals for driving the display device 38.

Figure 2:
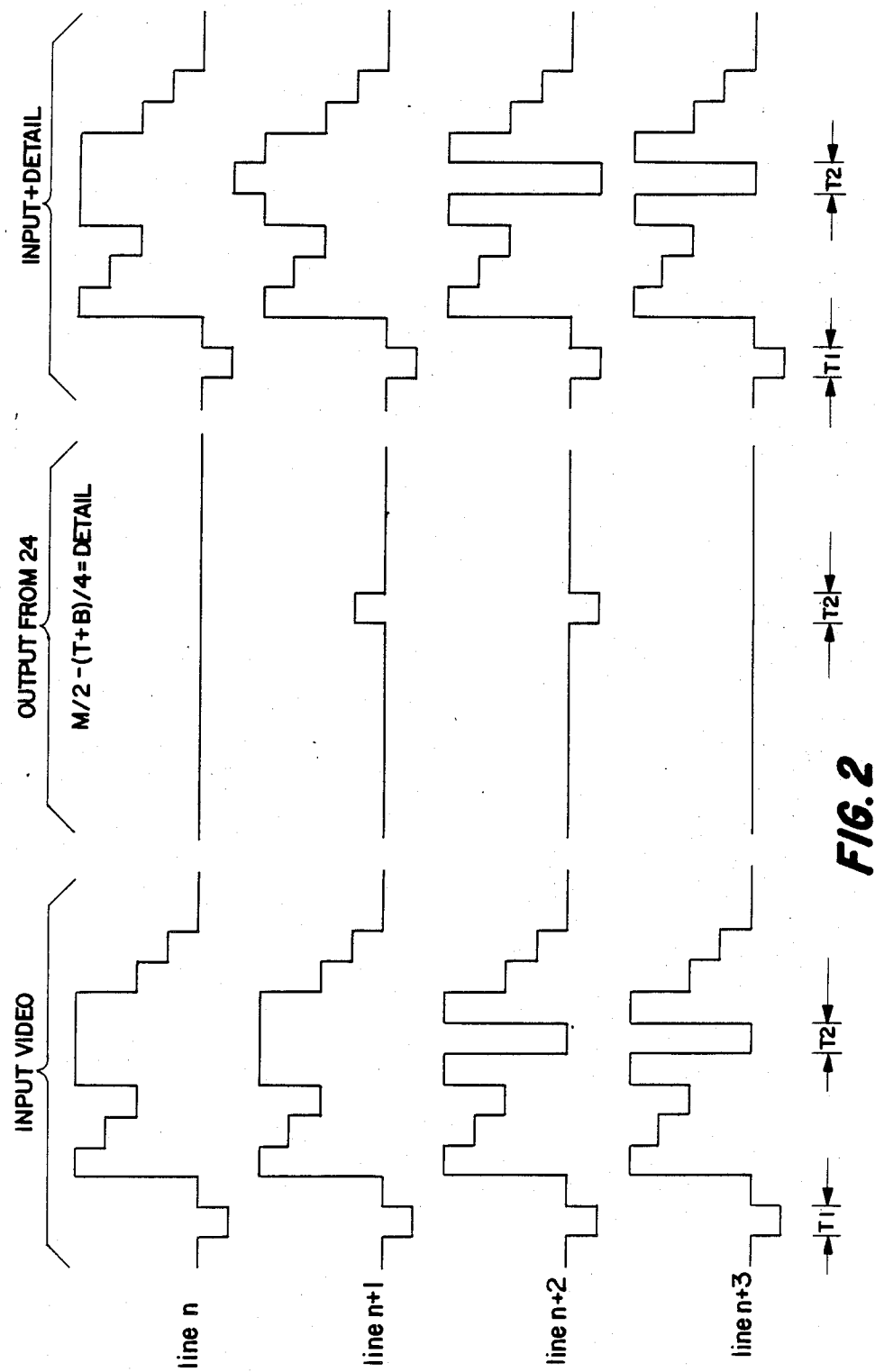
FIG. 2 is a waveform diagram useful in understanding the present invention.

Refer next to FIG. 2 which illustrates three sets of signals, which signals are drawn especially to emphasize the problem overcome by the invention. In the left portion of the drawing are four waveforms intended to represent four successive horizontal lines of low frequency composite video signal which may be available from low pass filters 14, 20 and 32. The timing interval T1 corresponds to the occurrence of the horizontal synchronizing signal in each line interval. The video signal is intended to be identical from line-to-line except at interval T2. Between the occurrence of lines n+1 and n+2 a signal change occurs during the interval T2 within the horizontal period. This change represents a vertical transition in the image to be displayed.

At any instant samples representing three vertically aligned picture elements (pixels) from three successive lines are output by low pass filter 14, 20 and 32. For example if ADC 23 is currently converting line n+3, then filters 14, 20 and 32 are currently producing filtered samples from lines n+3, n+2 and n+1 respectively. Due to the selection of scale factors for elements 16, 22 and 34, the combined signal provided by combining element 24 is weighted to correspond to vertical transitions attendant the horizontal line provided by delay element 18.

Signals provided by combining element 24 are combined with signals from delay element 18 in SCC 28. The set of signals drawn in the center of the FIG. 2 represent the output signals from combining element 24. The signals produced by element 24 are drawn adjacent the low frequency components of the composite video lines corresponding to the wideband composite video line with which it is combined in SCC 28. The signals from element 24 are zero valued except where a line-to-line difference occurs. A single transition between line intervals may be reflected in two line intervals as shown in FIG. 2. Note, however, that uniform changes over three or more lines will not produce (from the output of element 24) signals indicating the occurrence of such changes.

The set of signals drawn to the right of the FIG. 2 represent the sum of the horizontally adjacent signals to the left and center of the figure. It can be seen in the set of signals to the right of the FIG. 2, that during the interval T2 for line n+2, the amplitude of the combined signal is equal to the amplitude of the synchronizing components at interval T1. It will be readily appreciated that if the sync separator 37 is to detect the horizontal synchronizing signal as a function of its amplitude, it will perforce erroneously detect interval T2.

In order to preclude this happenstance, but otherwise not affect circuit performance, the signal combining circuit SCC 28 is designed to preclude the additive signal from NLP 26 from extending the luminance signal into the amplitude range of the synchronizing component.

FIG. 3 illustrates a first embodiment of a signal combining circuit which may be implemented for SCC 28. In FIG. 3 video signal from, for example, delay element 18 is applied to bus 50, and enhancing signal from, for example NLP 26 is applied to bus 58. Bus 50 is coupled to one input of adder 57 and to the subtrahend input of the subtracter 52. A reference value from source 53 is applied to the minuend input of the subtracter 52. The reference value, in this example, corresponds to black level or the most negative amplitude that the luminance signal is expected to attain in the active portion of a line interval. Subtracter 52 produces a signal corresponding to an inverted version of the signal applied on bus 50 and which is offset by the reference value. For the reference value being positive and equal to black level, the output signal from subtracter 52 will be negative valued for input signal amplitudes that are more positive than black level, zero valued for input signal amplitudes equal to black level, and positive valued for input signal amplitudes less positive than black level.

Subtracter 52 produces value bits and a sign bit which is presumed to be a logic one for negative output values and a logic zero for positive output values. The value bits provided by subtracter 52 are coupled to mutually exclusive first input terminals of a bank of two-input AND gates 54. The sign bit is coupled to the second input of each of the AND gates in bank 54. The AND gates 54 are conditioned by the sign bit to pass negative differences produced by subtracter 52 but provide zero values for positive differences. The values provided by AND gates 54 include the sign bit which may be routed through an AND gate in the bank of gates 54 or it may be routed around the AND gates. In either case it is desired that the signal provided by AND gates 54 be in two's complement format.

The output values from AND gates 54 are coupled to the minuend input port of a second subtracter 55 and to one input port of a multiplexer 56. The enhancing signal on bus 58 is coupled to the subtrahend input port of subtracter 55 and to a second input port of multiplexer 56. The polarity indicating sign bit from subtracter 55 is coupled to the control input terminal of multiplexer 56. The output of multiplexer 56 is coupled to a second input of adder 57.

Subtracter 55 will produce negative values whenever the signal from the AND gates 54 are more negative than the enhancing signal on bus 58. When this condition is satisfied, the enhancing signal, when added to the signal on bus 50, in adder 57, cannot pull the amplitude of the combined signal below the black level. If the output of subtracter 55 is positive, this indicates that the combination of the enhancing signal on bus 58 and the video signal on bus 50 will undesirably combine to produce amplitudes more negative than black level. Therefore when the subtracter 55 produces negative differences multiplexer 56 is conditioned to couple the enhancing signal on bus 58 to the adder 57. The output of adder 57 is the video signal enhanced in accordance with the signal on bus 58.

Alternatively, when subtracter 55 produces positive differences, multiplexer 56 couples the signal from the AND gates 54 to adder 57. This will only occur for negative valued signals on bus 58 because of the polarity discrimination performed by the AND gates. When the signal from the AND gates 54 is negative and combined with the video signal in adder 57, the amplitude of the combined signal is pulled to black level, since the signal from the AND gates 54 is a DC offset, negative version of the video signal.

The signal from the AND gates 54 is shown coupled directly to the multiplexer 56. In an alternative embodiment the signal from the AND gates may be scaled by, e.g. bit shifting, or it may be processed in some other manner.

Consider the input video signal from bus 50 to include a composite signal including a chrominance component in the form of a modulated subcarrier, the chrominance component occupying less than the entirety of the frequency passband of the composite signal. For certain amplitude signals, the difference provided by the bank of AND gates 54 may be greater and less than the enhancing signal for alternate half cycles of the subcarrier. In this instance the sign bit signal controlling the multiplexer 56 will oscillate between one and zero values and create an undesirable artifact in the output signal. In order to preclude this circumstance a filter 51 may be inserted between the bus 50 and the subtrahend input port of subtracter 52. The filter 51 may be a low pass filter designed to attenuate signals in the frequency band normally occupied by the chrominance component, or it may be a chrominance trap.

FIG. 4 illustrates a second embodiment of the combining circuit SCC 28. Elements in FIG. 4 designated with like numerals as elements in FIG. 3 are identical and perform like functions.

In some systems the black level may not be defined and thus a fixed black level reference for application to the minuend input port of subtracter 52 may not be easily selected. To overcome this difficulty the FIG. 4 SCC includes apparatus 100 for adaptively determining the reference value.

A first embodiment of circuitry 100 includes a D-type latch 72, having a data input port coupled to the input bus 50 and a data output, Q, coupled to the minuend input port of the subtracter 52 (via the dashed connection). The clock input terminal, C, of latch 72 is coupled to a source of pulses, $H_p$, which provides, e.g., one pulse per line interval, during the time interval that black level occurs in the video signal. Black level is loaded into latch 72 by the action of pulse $H_p$ and applied to subtracter 52 for the duration of each line interval. Alternatively, if it is anticipated that the signal will contain noise, it will be advantageous to average the black level values that are sampled during successive line intervals and apply the averaged value as the black level reference value.

Nominally black level occurs in the video signal immediately following the horizontal synchronizing pulses. The signal pulse $H_p$ may therefore be derived from the detected pulses.

A second embodiment which includes elements 72–82, develops the difference between black level and the tip of the synchronizing component as the reference value. The video signal on bus 50 is coupled to the data input port of latch 72 and to the subtrahend input port of subtracter 74. The output of latch 72 is coupled to the minuend input of subtracter 74. The pulses $H_p$ coupled to the clock input terminal of latch 72 are timed to load the value of the synchronizing component into the latch. For the duration of the synchronizing component, subtracter 74 will produce a zero valued output since the same input value will be coupled to both of its input ports. At the trailing transition of the synchronizing pulse when the signal amplitude moves to black level, subtracter 74 develops a negative valued output. At this time the sign bit of the difference provided by subtracter 74 changes from a zero to a one state. The sign bit is coupled to the set input terminal of a set-reset flip flop 76 which is reset by the pulses $H_p$. The output of flip flop 76 is coupled to the clock input of latch 80 via a delay element 78. The difference output from subtracter 74 is coupled to the data input port of latch 80. When the output of flip flop 76 changes state responsive to the sign bit from subtracter 74, this transition is delayed several sample periods in delay element 78 (to insure that the trailing transition of the synchronizing pulse has reached its maximum value) and coupled to latch 80 to store the current difference value from subtracter 74. This value represents the difference between the black level and the tip of the horizontal synchronizing pulse. No further values are stored in latch 80 until after the next occurrence of pulse $H_p$. Successive values output from latch 80 are averaged in the element 82. These values are negative valued due to the arrangement of input connections to the subtracter 74. The averaged values are therefore complemented and then coupled as the reference value to subtracter 52.

The averager 82 may be eliminated if desired. In addition it may be desirable to filter or core the video signal applied to apparatus 100 in order to preclude noise from interfering with the detection of the reference value.

In FIG. 4, a multiplexer 88 and reference source 86 have been substituted for the bank of AND gates 54 in FIG. 3

The output of subtracter 52 is coupled to one input port of multiplexer 88 and the source 86 is coupled to a second input port of multiplexer 88. The sign bit output from the subtracter 52 is coupled to the control input of multiplexer 88 and conditions the multiplexer to couple source 86 or subtracter 52 to its output for the subtracter 52 providing positive and negative differences respectively.

If the source 86 provides zero valued reference values then multiplexer 88 and source 86 emulate the AND gates 54 exactly. Alternatively if the source 86 is selected to provide negative reference values, negative peaking equal to the reference magnitude from source 86 can be applied to blacker than black signals. If the reference values are positive, blacker than black signal values will be offset positively by a value at least equal to the positive reference value.

Further modifications of the peaking function may be realized by adding a DC offset to the averaged value provided by averager 82 to subtracter 52.

The embodiments of FIGS. 3 and 4 are directed to limiting peaking in the negative sense however it can readily be adapted to limiting in the positive sense as well. For example to preclude peaking greater than a predetermined white level, a predetermined white level will be applied as the reference to subtracter 52, the sign bit from subracter 52 will be complemented before being coupled to the control inputs of the bank of gates 54, and the two signals input to subtracter 55 will be interchanged.

What is claimed is:

1. Signal combining means comprising:
   first and second input terminals for receiving first and second input signals;
   a source of a reference value;
   first means, coupled to said source and said first input terminal, for offsetting the amplitude values of said first input signal and providing an offset signal;
   second means, coupled to said first means and to said second input terminal, for providing said second input signal only when the combination of said first and second input signals will produce a combined signal having amplitude values which are not in a predetermined range of values; and
   third means, coupled to said first input terminal and to said second means for combining said first input signal and signal provided by said second means.

2. The signal combining means set forth in claim 1 wherein said first means comprises a subtracter having a minuend input terminal coupled to said source and a subtrahend input terminal coupled to said first input terminal.

3. The signal combining means set forth in claim 2 wherein said second means comprises:
   a polarity discriminator, coupled to said subtracter, for providing difference values output by said subtracter of one polarity only;
   a comparator having first and second input ports coupled respectively to said second input terminal and said polarity discriminator, and having an output terminal, for providing a signal indicating which of two signals applied to its first and second input ports has the greater value; and
   a multiplexer having first and second input ports coupled respectively to said polarity discriminator and said second input terminal, having a control input terminal coupled to the output terminal of said comparator, and having an output terminal.

4. The signal combining means set forth in claim 3 wherein said third means comprises a signal summer having first and second inputs coupled respectively to said first input terminal and to the output terminal of said multiplexer, and having an output terminal for providing said combined signal.

5. The signal combining means set forth in claim 1 wherein said second means comprises:
   a polarity discriminator, coupled to said first means for providing amplitude values of said offset signal of only one polarity;
   a comparator having first and second input ports coupled respectively to said second input terminal and said polarity discriminator, and having an output terminal, for providing a signal indicating which of two signals applied to its first and second input ports has the greater value; and
   a multiplexer having first and second input ports coupled respectively to said polarity discriminator and said second input terminal, having a control input terminal coupled to the output terminal of said comparator, and having an output terminal.

6. The signal combining means set forth in claim 5 wherein said offset signal is a plural bit binary sampled data signal, each sample of which contains N bits including a polarity indicating sign bit and (N−1) value bits, N an integer, and wherein said polarity discriminator comprises a plurality of (N−1) two input logic gates each of which has one input coupled for receiving said sign bit, and a second input coupled to a mutually exclusive different one of said value bits, each of said logic gates providing a like valued output signal for said sign bit having a first state, and providing output values related to the respective value bit applied thereto for said sign bit having a second state.

7. The signal combining means set forth in claim 5 wherein said offset signal contains a polarity indicating component and said polarity discriminator comprises:
   a further reference source;
   a multiplexer having first and second signal input terminals coupled respectively to said further reference source and said first means, and having a control input responsive to said polarity indicating component.

8. Video signal processing apparatus comprising:
   a video input terminal for applying video signal including a synchronizing component, said video signal occurring as a sequence of horizontal lines of signal;
   first means, coupled to said video input terminal, for producing a difference signal related to differences between said horizontal lines;
   second means, coupled to said video input terminal and to said first means, for combining said difference signal with said video signal only when the combination of such signals will not produce signal amplitudes in a range of amplitudes occupied by said synchronizing component.

9. The video processing apparatus set forth in claim 8 wherein said second means comprises:
   a source of a reference value;
   third means, coupled to said source and said video input terminal, for offsetting the amplitude values of said video input signal and providing an offset signal;
   fourth means, coupled to said third means and to said first means, for providing said difference signal only when the combination of said video signal and said difference signal will not produce a combined signal having amplitude values in a range of amplitudes occupied by said synchronizing component; and
   fifth means, coupled to said video input terminal and to said fourth means for combining said video input signal and signal provided by said fourth means.

10. The video signal processing apparatus set forth in claim 9 wherein said third means comprises a subtracter having a minuend input terminal coupled to said source and a subtrahend input terminal coupled to said video input terminal.

11. The video signal processing apparatus set forth in claim 10 wherein said fourth means comprises:
   a polarity discriminator, coupled to said subtracter, for providing difference values output by said subtracter of one polarity only;
   a comparator having first and second input ports coupled respectively to said first means and said polarity discriminator, and having an output terminal, for providing a signal indicating which of two signals applied to its first and second input ports has the greater value; and
   a multiplexer having first and second input ports coupled respectively to said polarity discriminator and said first means, having a control input terminal coupled to the output terminal of said comparator, and having an output terminal.

12. The video signal processing apparatus set forth in claim 11 wherein said fifth means comprises a signal summer having first and second inputs coupled respectively to the video input terminal and the output terminal of said multiplexer, and having an output terminal for providing combined signal.

13. The video signal processing apparatus set forth in claim 9 wherein said fourth means comprises:
a polarity discriminator, coupled to said third means, for providing amplitude values of said offset signal of one only polarity;
a comparator having first and second input ports coupled respectively to said first means and said polarity discriminator, and having an output terminal, for providing a signal indicating which of two signals applied to its first and second input ports has the greater value; and
a multiplexer having first and second input ports coupled respectively to said polarity discriminator and said first means, having a control input terminal coupled to the output terminal of said comparator, and having an output terminal.

14. The video signal processing apparatus set forth in claim 13 wherein said offset signal is a plural bit binary sampled data signal, each sample of which contains N bits including a polarity indicating sign bit and (N−1) value bits, N an integer, and wherein said polarity discriminator comprises a plurality of (N−1) two input logic gates each of which has one input coupled for receiving said sign bit, and a second input coupled to a mutually exclusive different one of said value bits, each of said logic gates providing a like valued output signal for said sign bit having a first state, and providing output values related to the respective value bit applied thereto for said sign bit having a second state.

15. The video signal processing apparatus set forth in claim 8 wherein said video signal is a composite video signal and said first means comprises:
delay means having a plurality (including two) of video output terminals for providing a plurality of video signals representing different ones of said horizontal lines;
weighting and combining means, coupled to said plurality of video output terminals for scaling and combining said plurality of video signals to produce a signal related to signal differences between said horizontal lines; and
nonlinear processing means coupled to said weighting and combining means.

16. Signal combining means comprising:
first and second signal input terminals for receiving first and second input signals respectively;
a source of a reference value;
a subtracter having first and second input ports coupled respectively to said source and said first signal input terminal, and having an output terminal for providing difference values;
first means coupled to the output terminal of said subtracter for providing difference signals of a first polarity and for difference signals of opposite polarity, providing a predetermined value;
comparing means, having first and second input ports coupled respectively to said second signal input terminal and said first means, for providing at an output terminal thereof a control signal indicating which of said second input signal and signal provided by said first means has the lesser value;
second means, having a control input terminal coupled to said comparing means, and first and second input ports coupled respectively to said first and second signal input terminals, for combining said first and second input signals responsive to a predetermined state of said control signal.

17. The signal combining means set forth in claim 16 wherein said second means comprises:
a multiplexer having first and second signal input ports coupled respectively to said second signal input terminal and said first means, having a control input terminal coupled to said comparator means, and having an output terminal; and
a signal summer having first and second input ports coupled respectively to said first signal input terminal and the output terminal of said multiplexer, and having an output terminal for providing combined signal.

18. The signal combining means set forth in claim 16 wherein said first input signal is a video signal including a first component and a second component, said second component occupying a predetermined frequency spectrum and wherein said signal combining means further includes filter means coupled between said first signal input port and the second input port of said subtracter for attenuating said second component.

19. The signal means set forth in claim 1 wherein said first input signal includes first and second signal components occupying different frequency passbands, and wherein said signal combining means further includes filter means coupled between said first input terminal and said first means, for substantially attenuating said second signal component.

* * * * *